United States Patent [19]

Szulczyk

[11] 4,344,794

[45] Aug. 17, 1982

[54] SOLDER ALLOY FOR THE DIRECT SOLDERING OF OXIDE CONTAINING SILVER CATALYST ON CATALYST CARRIER

[75] Inventor: Andreas Szulczyk, Linsengericht, Fed. Rep. of Germany

[73] Assignee: Degussa AG, Frankfurt, Fed. Rep. of Germany

[21] Appl. No.: 211,940

[22] Filed: Dec. 1, 1980

[30] Foreign Application Priority Data

Dec. 5, 1979 [DE] Fed. Rep. of Germany ....... 2948915

[51] Int. Cl.³ .............................................. C22C 5/08
[52] U.S. Cl. ................................. 75/173 C; 75/134 C
[58] Field of Search ........................... 75/134 C, 173 C

[56] References Cited

U.S. PATENT DOCUMENTS

| | | | |
|---|---|---|---|
| 2,151,905 | 3/1939 | Emmert | 75/173 C |
| 2,196,302 | 4/1940 | Hensel et al. | 75/173 C |
| 2,914,435 | 11/1959 | Wasserman et al. | 75/173 C |
| 2,970,248 | 1/1961 | Sahagun | 75/173 C |
| 4,164,419 | 8/1979 | Kaji et al. | 75/134 C X |

FOREIGN PATENT DOCUMENTS

| | | | |
|---|---|---|---|
| 52-76218 | 6/1977 | Japan | 75/134 C |
| 392078 | 9/1965 | Switzerland | 75/173 C |

OTHER PUBLICATIONS

Johnson et al., Splat Cooled Alloys in the Ag–Sn–Cu System; pert pgs–pgs–p. 5 (Table 1); Mar. 1973.

*Primary Examiner*—L. Dewayne Rutledge
*Assistant Examiner*—David A. Hey
*Attorney, Agent, or Firm*—Cushman, Darby & Cushman

[57] ABSTRACT

For soldering non-noble metal containing silver contacts on contact carriers, solders are needed which permit a direct soldering without production of an oxide free intermediae layer. This is attained with solders that consist of a silver-copper alloy with cadmium and/or tin and/or indium whereby the composition must be so selected that the liquidus temperature does not exceed 750° C.

4 Claims, No Drawings

SOLDER ALLOY FOR THE DIRECT SOLDERING OF OXIDE CONTAINING SILVER CATALYST ON CATALYST CARRIER

BACKGROUND OF THE INVENTION

The invention is directed to phosphorus free solder alloys for the direct soldering of electrical contacts of silver with one or more metal oxides on contact carriers.

Silver-metal oxide work materials are employed to a large extent because of their favorable industrial switching properties as contact material in switching devices with a high number of switches with small or average power load. The most important representatives of this combination work material group are silver-cadmium oxide, silver-tin oxide, silver-zinc oxide and silver-indium oxide.

Because of the high metal oxide contents the contact coatings according to the present state of the art are not directly solderable on metallic contact carriers. The contact coatings (superimposed layers) must therefore be made solderable for the use as contact material in electrical switching devices. For this reason the contact coatings must be provided on one side with a layer of a readily solderable or weldable metal or metal alloy.

Thus it is known for example to only oxidize the workpieces consisting of silver alloys internally on one side (about 70% of the sheet thickness) and to use the non-oxidized metallic surface as a solderable surface (German AS 10 33 815). However, the process is only usable with silver alloys, which can be oxidized internally and are still sufficiently ductile in the oxidized condition, so that they can be coverted to the finished part. With silver alloys, which are not sufficiently ductile in the oxidized condition the shaping takes place before the oxidation. Hereby the initial material for the production of a solderable layer is plated with silver. The contact coatings are then oxidized as finished part (German AS 23 34 160 and 18 03 502). However, with long oxidation time the silver layer loses adhesiveness and the finished contact coatings separate in operation from the contact carrier.

Silver-metal oxide contacts produced by powder metallurgy by pressing and common sintering can be provided with a solderable silver layer (German AS 11 87 333). However, this process is expensive and only usable with silver-metal-oxide-contact coatings produced by powder metallurgy.

From German AS 10 90 484 it is known to provide silver-cadmium alloy on one side with a silver solder layer and only there to oxide internally. However, the process has the disadvantage that it is only usable with internally oxidizable contact materials. Furthermore, metal physically conditioned phenomena here lead to industrial processing difficulties which later bring with it operating difficulties in the soldering of the contact piece (e.g., increase of the working temperature of the solder).

In German AS 12 32 282 there is described a soldering process in which the contact surface to be soldered is preliminarily soldered with a tin-lead-soft solder and subsequently the contact is soldered on the contact carrier with a customary silver-hard solder. The disadvantage of this process is that the parts to be joined must be heated for several minutes to temperatures above the working temperature of the silver-hard solder in order to guarantee a trouble free bond. If the contact carrier consists of hardened alloys then the hardening effect can be lost.

Besides it is known (German AS 23 65 450 to back the silver-metal oxide workpiece with a solderable silver-copper alloy having 10 to 28% copper which wets the joining work material. Here also before the true soldering process there must first be applied a solderable layer.

Furthermore, it is known to apply a reactive solder based on copper-silver-phosphorus as a solderable layer on the silver-metal oxide-work material (German OS 24 38 922). Hereby, however, the reaction products formed must be removed in a further operation. Besides phosphorus containing solders are not suited to the direct soldering of contact coatings on iron containing contact carriers because of the formation of brittle iron phosphide layers.

Therefore it was the problem of the present invention to find phosphorus free solder alloys for the direct soldering of electrical contacts made of silver with one or more metal oxides to contact carriers which are simple, universal and reliable to employ and in which no reaction products must be removed in an additional operation.

SUMMARY OF THE INVENTION

This problem was solved according to the invention by preparing a solder made of a silver-copper alloy with cadmium and/or tin and/or indium, whereby the composition must be so chosen that the liquidus temperature does not exceed 750° C. Preferably there is used as an additive to the silver-copper alloy the metal which is also contained in the contact work material as metal oxide.

With iron containing contact carriers it has proven good to add to the solder up to 0.5% of lithium and/or zinc to improve the wettability.

Advantageously there are used soldering alloys which contain 20 to 70 weight %, especially 25 to 65%, of silver, 10 to 50 weight %, especially 20 to 40%, of copper and 10 to 40 weight % of cadmium and/or tin or and/or indium. There have proven to be especially good alloys containing 55 to 65% silver, 25 to 30% copper and 10 to 20% indium or 25 to 60% silver, 20 to 35% copper and 20 to 40% cadmium.

It has surprisingly turned out that in contrast to the state of the art the soldering alloys of the invention are suited for the direct soldering of contact work having high metal oxide contents, e.g., 12 weight % of metallic oxide, on contact carriers.

Further more, it has been surprisingly discovered that there can be employed according to the invention silver containing alloys of the invention which contain operating temperature and wetting requirement alloy components; whose thermochemical activity is reduced to such an extent compared to the metal oxide employed in the contact layer, that no, or no complete reduction of the metal oxide occurs in the bonding zone and forms no brittle zone in the bonding region (e.g., with Ag-Cu-In-alloys).

Unless otherwise indicated all parts and percentages are by weight.

The solders can comprise, consist essentially of or consist of the stated materials.

DETAILED DESCRIPTION

The following example further explains the use of the soldering alloys of the invention.

Ag/CdO-contact superimposed layers (or coatings) containing 12 weight % of CdO with a solderable intermediate layer were soldered to iron or copper carriers with solders of the following composition.
1. 53% Ag, 21% Cu, 25.8% Cd, 0.2% Li
2. 30% Ag, 33% Cu, 37% Cd
3. 60% Ag, 27% Cu, 13% In Functional tests were carried out in two series of switching devices with the soldered contact layers whereby the following test conditions were chosen.

Relay Type I

Rated Current: 250 A, 3 phase, double break
Test Voltage: 380 V, 50 Hz
Starting Current: 1000 A
Breaking Current: 1000 A
Cos $\phi$: 0.4
Duration of application of voltage: about 80 milliseconds
Switching frequency: 250/h

Relay Type II

Rated Current: 75 A, 3 phase, double break
Test Voltage: 380 V, 50 Hz
Starting Current: 415 A
Breaking Current: 415 A
Cos $\phi$: 0.35
Duration of application of voltage: about 80 milliseconds
Switching frequency: 250/h The functional tests gave the following results.

| Solder Material | Relay Type | Number of Switchings Reached (Rated Number of Switchings 50,000) |
| --- | --- | --- |
| AG—Cu—Cd | I | 50,000 |
| Ag—Cu—Cd | II | 50,000 |
| Ag—Cu—Cd—Li | II | 50,000 |
| Ag—Cu—In | I | 50,000 |

The soldering alloys of the invention thus are outstandingly suited for the direct soldering of electrical contact coatings of silver and metal oxides to contact carriers and cause an excellent adhesion between the contact layer and the contact carrier.

The entire disclosure of German priority application P 29 48 915.4 is hereby incorporated by reference.

What is claimed is:

1. A phosphorus free soldering alloy suitable for the direct soldering of an electrical contact of silver containing at least one metal oxide to a contact carrier consisting essentially of a silver-copper alloy consisting of (1) 53% Ag, 21% Cu, 25.8% Cd and 0.2% Li, or (2) 30% Ag, 33% Cu and 37% Cd, or (3) 60% Ag, 27% Cu and 13% In.

2. A soldering alloy according to claim 1 consisting of 53% Ag, 21% Cu, 25.8% Cd and 0.2% Li.

3. A soldering alloy according to claim 1 consisting of 30% Ag, 33% Cu and 37% Cd.

4. A soldering alloy according to claim 1 consisting of 60% Ag, 27% Cu and 13% In.

* * * * *